(12) United States Patent
He

(10) Patent No.: US 9,933,648 B2
(45) Date of Patent: Apr. 3, 2018

(54) WIDE VIEWING FILM AND WIDE VIEWING TFT-LCD HAVING THE SAME

(71) Applicant: Shenzhen China Star Optoelectronics Technology Co., Ltd., Shenzhen, Guangdong (CN)

(72) Inventor: Hu He, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 228 days.

(21) Appl. No.: 14/890,626

(22) PCT Filed: Oct. 23, 2015

(86) PCT No.: PCT/CN2015/092718
§ 371 (c)(1),
(2) Date: Nov. 12, 2015

(87) PCT Pub. No.: WO2016/206261
PCT Pub. Date: Dec. 29, 2016

(65) Prior Publication Data
US 2017/0160582 A1     Jun. 8, 2017

(30) Foreign Application Priority Data
Jun. 23, 2015 (CN) .......................... 2015 1 0350791

(51) Int. Cl.
G02F 1/1335     (2006.01)

(52) U.S. Cl.
CPC .. *G02F 1/133504* (2013.01); *G02F 1/133514* (2013.01); *G02F 1/133528* (2013.01)

(58) Field of Classification Search
CPC ................. G01N 2202/12; G01N 2201/06113
See application file for complete search history.

(56) References Cited

U.S. PATENT DOCUMENTS

2003/0048400 A1* 3/2003 Kim ................. G02F 1/133504
                                                         349/117
2005/0088597 A1* 4/2005 Maeda ................. G02F 1/1333
                                                         349/139
(Continued)

FOREIGN PATENT DOCUMENTS

CN        1401382 A      4/2003
CN        1407382 A      4/2003
(Continued)

*Primary Examiner* — Michael Caley
*Assistant Examiner* — Mariam Qureshi
(74) *Attorney, Agent, or Firm* — Andrew C. Cheng

(57) ABSTRACT

A wide viewing film and a TFT-LCD having the same. The wide viewing film includes: a prism layer, and a substrate layer. Wherein, the prism layer is fixed on the substrate layer, and a light emitting surface of the prism layer is contacted with a light incident surface of the substrate layer. Besides, each of the prism layer and the substrate layer is made of a transparent material, multiple quadrangular pyramid-shaped protrusions are disposed separately on the light incident surface of the prism layer, and the light incident surface of the prism layer between adjacent quadrangular pyramid-shaped protrusions is a planar surface. The TFT-LCD includes a first polarizing film, a liquid crystal panel, a color filter, a second polarizing film and a wide viewing film disposed along a light propagation direction. Wherein, the light incident surface of the prism layer faces a light emitting surface of the second polarizing film.

6 Claims, 7 Drawing Sheets

(56) References Cited

U.S. PATENT DOCUMENTS

| | | | | |
|---|---|---|---|---|
| 2005/0111240 A1* | 5/2005 | Yonekubo | ................ | G02B 5/04 |
| | | | | 362/617 |
| 2005/0212989 A1* | 9/2005 | Kashiwagi | ........... | G02B 3/0031 |
| | | | | 349/56 |
| 2007/0242334 A1* | 10/2007 | Selbrede | ................ | G02B 5/124 |
| | | | | 359/222.1 |
| 2010/0124047 A1* | 5/2010 | Ahn | ........................ | G02B 5/02 |
| | | | | 362/97.3 |
| 2013/0107575 A1 | 5/2013 | Wang He | | |

FOREIGN PATENT DOCUMENTS

| | | | |
|---|---|---|---|
| CN | 1688901 | A | 10/2005 |
| CN | 202757054 | U | 2/2013 |
| JP | 2013122832 | A | 6/2013 |
| WO | 9630668 | A1 | 3/1996 |

\* cited by examiner

|  | reference | Example 1 |
|---|---|---|
| L | — | 50 |
| P | — | 200 |
| brightness (%) | 100% | 94% |
| Brightness and viewing angle |  |  |

|  | Example 2 | Example 3 |
|---|---|---|
| L | 50 | 50 |
| P | 150 | 100 |
| brightness (%) | 89% | 75% |
| Brightness and viewing angle |  |  |

| | REFERENCE | EXAMPLE 1 | EXAMPLE 2 | EXAMPLE 3 |
|---|---|---|---|---|
| L | | 50 | 50 | 50 |
| P | | 200 | 200 | 200 |
| INCLUDED ANGLE | | 30 | 45 | 60 |
| BRIGHTNESS (%) | 100% | 100% | 94% | 102% |
| BRIGHTNESS AND VIEWING ANGLE | | | | |

FIG. 10

WIDE VIEWING FILM AND WIDE VIEWING TFT-LCD HAVING THE SAME

BACKGROUND OF THE INVENTION

1. Field of the Invention

The present invention relates to a viewing angle compensation field of a liquid crystal display, and more particularly to a wide viewing film and a wide viewing thin-film-transistor liquid-crystal-display (TFT-LCD) having the same.

2. Description of Related Art

The thin film transistor liquid crystal display (TFT-LCD) is one of the liquid crystal displays, and mainly uses the thin-film-transistor technology to improve the image quality. General speaking, the TFT-LCD can be regarded as two glass substrates and a liquid crystal layer disposed between the two substrates. The upper glass substrate is a color filter, and a lower substrate is provided with thin-film transistors. When current pass through the transistors, the electric field is changed such that the liquid crystal molecules are tilted so that the polarizing polarity of the light are changed. At the same time, polarizing film can be provided to change a bright and dark status of pixels in order to control the emitting of polarized light of each pixel in order to achieve an expected display.

In the conventional art, the problem is that after back lights pass through the polarizing film and TFT, the outputted lights has directionality. That is, most of light is perpendicularly emitted out from a screen. Accordingly, when viewing the LCD with a larger angle, the original color cannot be seen. Even, only full white or full black can be observed. FIG. 1 is a relationship among a white picture brightness, chromaticity and viewing angle, as shown at a left drawing of FIG. 1, when the brightness at an observation direction is decreased to one third of the brightness at a normal line direction, the viewing angle is less than 100 degrees. At the same time, when the when the brightness at an observation direction is decreased to one half of the brightness at a normal line direction, the viewing angle is smaller. Two drawings at right side of FIG. 1 are respectively chromaticity coordinates in an X direction (a horizontal direction) and in a Y direction (a vertical direction). As shown in the two drawings, the color shift at a large viewing angle is more serious.

Besides, along with the demand for the quality of the image of the display, the requirement for the LCD is higher. For example, the LCD becomes larger and larger so that many people watch a same TV such that the viewing angle of the LCD should be widen. Therefore, developing a technology for widening the view angle of the LCD is urgent.

SUMMARY OF THE INVENTION

To overcome the deficiencies of the prior art, the present invention provides a wide viewing film and a wide viewing TFT-LCD having the same, the wide viewing TFT-LCD can increase the viewing angle and the display effect at a horizontal direction and a vertical direction According to an embodiment of the present invention, a technology solution adopted by the present invention is to provide: a wide viewing film, comprising: a prism layer having a light incident surface and a light emitting surface; and a substrate layer having a light incident layer; wherein, the prism layer is fixed on the substrate layer, and the light emitting surface of the prism layer is contacted with the light incident surface of the substrate layer; and wherein, each of the prism layer and the substrate layer is made of a transparent material, multiple quadrangular pyramid-shaped protrusions are disposed separately on the light incident surface of the prism layer, and the light incident surface of the prism layer between adjacent quadrangular pyramid-shaped protrusions is a planar surface.

Wherein, a bottom surface of each quadrangular pyramid-shaped protrusion is a rectangle, each quadrangular pyramid-shaped protrusion satisfies following conditions:

$$40° \leq A \leq 50°;$$
$$0.25 \leq \frac{L_1}{P_1} \leq 0.5; \text{ and}$$
$$0.25 \leq \frac{L_2}{P_2} \leq 0.5;$$

wherein, A represents an included angle between a side surface and the bottom surface of the quadrangular pyramid-shaped protrusion; each of $L_1$ and $L_2$ represents an edge length of the bottom surface of the quadrangular pyramid-shaped protrusion; $P_1$ represents a distance between adjacent quadrangular pyramid-shaped protrusions along a direction of $L_1$; and $P_2$ represents a distance between adjacent quadrangular pyramid-shaped protrusions along a direction of $L_2$.

Wherein, shapes of the multiple quadrangular pyramid-shaped protrusions are similar, but bottom surfaces of the multiple quadrangular pyramid-shaped protrusions are not the same.

Wherein, the multiple quadrangular pyramid-shaped protrusions are arranged on the light incident surface of the prism layer as a dotted matrix.

Wherein, a refractive index of the prism layer is greater than 1.53.

Wherein, the substrate layer is a polyethylene terephthalate (PET) layer, a polycarbonate (PC) layer or a polymethylmethacrylate (PMMA) layer.

According to an embodiment of the present invention, a technology solution adopted by the present invention is to provide: a wide viewing angle thin-film-transistor liquid crystal display (TFT-LCD), including a first polarizing film, a liquid crystal panel, a color filter, a second polarizing film and a wide viewing film disposed along a light propagation direction, and the wide viewing film comprises: a prism layer having a light incident surface and a light emitting surface; and a substrate layer having a light incident layer; wherein, the light incident surface of the prism layer faces a light emitting surface of the second polarizing film; wherein, the prism layer is fixed on the substrate layer, and the light emitting surface of the prism layer is contacted with the light incident surface of the substrate layer; and wherein, each of the prism layer and the substrate layer is made of a transparent material, multiple quadrangular pyramid-shaped protrusions are disposed separately on the light incident surface of the prism layer, and the light incident surface of the prism layer between adjacent quadrangular pyramid-shaped protrusions is a planar surface.

According to the wide viewing film and the wide viewing TFT-LCD having the same of the present invention, the viewing angle at the horizontal direction and the vertical direction can be increased, the light transmittance can be increased and decreasing a possibility of generating a Moire pattern so as to improve the display effect.

BRIEF DESCRIPTION OF THE DRAWINGS

FIG. 10 is a comparison table of brightness and viewing angle between a conventional LCD and a wide viewing TFT-LCD according to another embodiment of the present invention.

DETAILED DESCRIPTION OF THE PREFERRED EMBODIMENT

The following content will combine the figures for describing the wide viewing film and the wide viewing TFT-LCD having the same. It should be noted that the figures provided are only used for helping person skilled in the art to fully understand the structure and operation principle of the wide viewing film and the wide viewing TFT-LCD having the same, not used for limiting the present invention.

Figure 1:
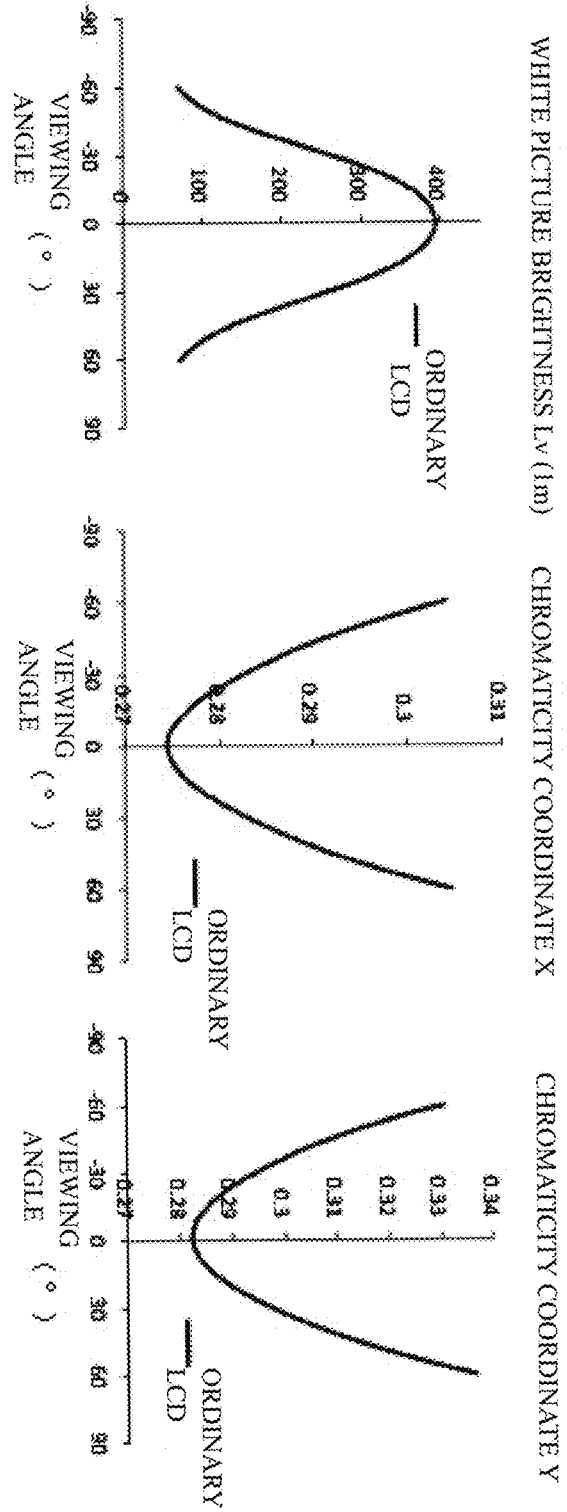
FIG. 1 is a relationship among a white picture brightness, chromaticity and viewing angle.
Figure 2:
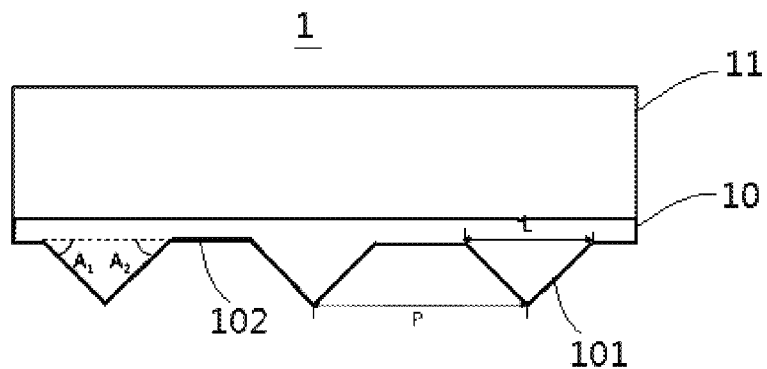
FIG. 2 is a cross-sectional view of a wide viewing film according to an embodiment of the present invention.

FIG. 2 is a cross-sectional view of a wide viewing film according to an embodiment of the present invention With reference to FIG. 2, the wide viewing film 1 according to the embodiment of the present invention includes a prism layer 10 and a substrate layer 11. The prism layer 10 includes a light incident surface and a light emitting surface which are disposed oppositely. The prism layer 10 is fixed on the substrate layer 11. The light emitting surface of the prism layer 10 is contacted with a light incident surface of the substrate layer 11. Multiple quadrangular pyramid-shaped protrusions 101 (the quadrangular pyramid-shaped protrusion 101 is also known as an inverse pyramid structure) are disposed separately on the light incident surface of the prism layer 10. The light incident surface of the prism layer 10 between adjacent quadrangular pyramid-shaped protrusions 101 is a planar surface 102. A bottom surface of the quadrangular pyramid-shaped protrusion 101 and the planar surface 102 are located on a same plane. Four side surfaces of the quadrangular pyramid-shaped protrusion 101 and the planar surface 102 jointly function as the light incident surface of the wide viewing film 1.

Figure 3:
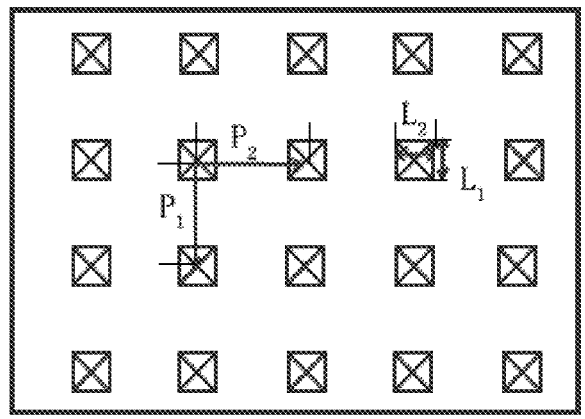
FIG. 3 is a plan view of a wide viewing film according to an embodiment of the present invention.
Figure 4:
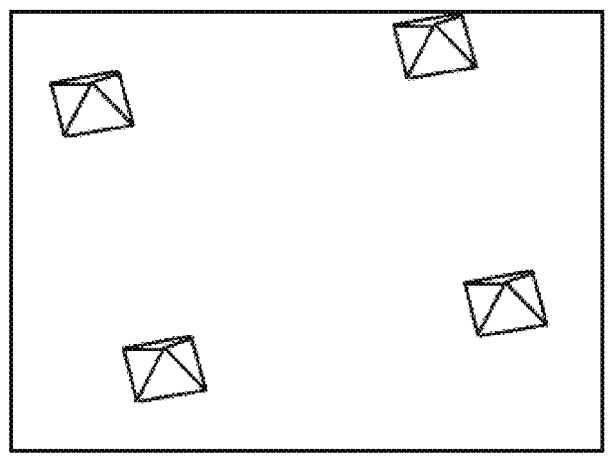
FIG. 4 is a three-dimensional diagram of a wide viewing film according to an embodiment of the present invention.
Figure 5:
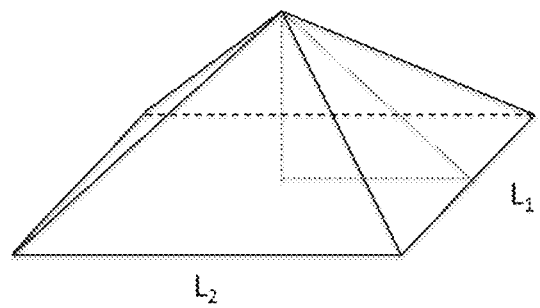
FIG. 5 is a schematic diagram of a quadrangular pyramid-shaped protrusion on a prism layer of a wide viewing film according to an embodiment of the present invention.

FIG. 3 is a plan view of a wide viewing film according to an embodiment of the present invention; FIG. 4 is a three-dimensional diagram of a wide viewing film according to an embodiment of the present invention; FIG. 5 is a schematic diagram of a quadrangular pyramid protrusion on a prism layer of the wide viewing film according to an embodiment of the present invention.

With reference to FIG. 3 to FIG. 5, a bottom surface of the quadrangular pyramid-shaped protrusion 101 is preferably a rectangle. The multiple quadrangular pyramid-shaped protrusions 101 are arranged on the light incident surface of the prism layer 10 as a dotted matrix.

Preferably, in the embodiment of the present invention, each of the quadrangular pyramid-shaped protrusions 101 satisfies the following conditions:

$$40° \leq A \leq 50°;$$
$$0.25 \leq \frac{L_1}{P_1} \leq 0.5; \text{ and}$$
$$0.25 \leq \frac{L_2}{P_2} \leq 0.5;$$

Wherein, A represents an included angle between a side surface and the bottom surface of the quadrangular pyramid-shaped protrusion 101 (as shown as $A_1$ and $A_2$ in FIG. 2). Each of $L_1$ and $L_2$ represents an edge length of the bottom surface of the quadrangular pyramid-shaped protrusion 101. $P_1$ represents a distance between adjacent quadrangular pyramid-shaped protrusions 101 along a direction of the $L_1$, and $P_2$ represents a distance between adjacent quadrangular pyramid-shaped protrusions 101 along a direction of the $L_2$. Preferably, each of the quadrangular pyramid-shaped protrusions 101 is a regular quadrangular pyramid.

Preferably, in the embodiment of the present invention, a refractive index of the quadrangular pyramid-shaped protrusion 101 is greater than 1.53.

Preferably, in a same wide viewing film 1, each included angle between the side surface and the bottom surface of all of the quadrangular pyramid-shaped protrusions 101 is the same such that a refraction effect of each quadrangular pyramid-shaped protrusion 101 is the same or similar. That is, a viewing angle widening effect at each position of the light emitting surface of the LCD is basically the same in order to increase the entire display effect of the liquid crystal display device.

Besides, preferably, in a same wide viewing film 1, a ratio of $L_1$ to $P_1$ and a ratio of $L_2$ to $P_2$ of the multiple quadrangular pyramid-shaped protrusions 101 can be changed (that is, ratios of $L_1$ to $P_1$ and ratios of $L_2$ to $P_2$ of some quadrangular pyramid-shaped protrusions 101 are different from ratios of $L_1$ to $P_1$ and ratios of $L_2$ to $P_2$ of other quadrangular pyramid-shaped protrusions 101) Accordingly, continuously changing the ratios of $L_1$ to $P_1$ and the ratios of $L_2$ to $P_2$ makes the periodicity and the sizes of the quadrangular pyramid-shaped protrusions 101 to be changed continuously. That is, an arrangement of the quadrangular pyramid-shaped protrusions 101 becomes irregular. At the same time, the light incident surface of the entire wide viewing film forms an undulating structure. The purpose of the above arrangement is that: avoiding the periodicity structure of the quadrangular pyramid-shaped protrusions 101 and pixels of the LCD from generating an interference phenomenon in order to decrease a possibility of generating a Moire pattern so as to increase the display effect of the liquid crystal display.

In the present invention, the substrate layer 11 is made of a plastic material. At the same time, the substrate layer 11 can be disposed to have certain toughness. For example, the substrate layer 11 can be a polyethylene terephthalate (PET) layer, a polycarbonate (PC) layer or a polymethylmethacrylate (PMMA) layer. However, the present invention is not limited. In an actual application, the substrate layer 11 can also be made of another material such as glass.

Figure 6:
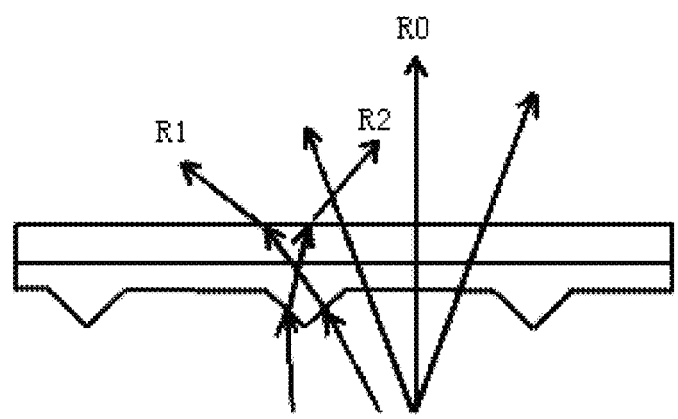
FIG. 6 is an operation principle diagram of a wide viewing film according to an embodiment of the present invention.

FIG. 6 is an operation principle diagram of a wide viewing film according to an embodiment of the present invention.

The following content will combine with FIG. 6 to describe the function and the effect of the wide viewing film 1 for lights. A light R1 and a light R2 enter to side surfaces of the quadrangular pyramid-shaped protrusion 101, entering into the wide viewing film 1 from the side surfaces, sequentially passing through the prism layer 10 and the substrate layer 11, then, emitting out from a light emitting surface of the substrate layer 11. Through the refraction principle, after the light R1 and the light R2 pass through the wide viewing film 1, an included angle between the light R1 and a normal line of the light emitting surface of the substrate layer 11, and an included angle between the light R2 and the normal line of the light emitting surface of the substrate layer 11 are increased such that the brightness is increased at a larger viewing angle. That is, the viewing angle of the liquid crystal display device is increased. In the present invention, the quadrangular pyramid-shaped protrusions 101 are provided. With reference to FIG. 3 to FIG. 5, each quadrangular pyramid-shaped protrusion 101 includes two side surfaces located at a first direction (the direction of L2) and two side surfaces located at a second direction (the direction of L1). Therefore, incident lights at a horizontal direction and a vertical direction can be refracted in order to increase viewing angles at the horizontal direction and the vertical direction.

Besides, a light R0 enters into the wide viewing film 1 through the planar surface 102. Then, the light R0 emits out through the light emitting surface of the substrate layer 11. After the light R0 pass through the wide viewing film 1, an included angle between the light R0 and the normal line of the emitting surface of the substrate layer 11 is basically unchanged. Accordingly, a propagation direction of the light R0 is maintained so as to maintain the brightness under a viewing angle of front view. Besides, disposing the planar surface 102 can save the manufacturing material for the prism layer in order to decrease the manufacturing cost of the wide viewing film 1.

Figure 7:
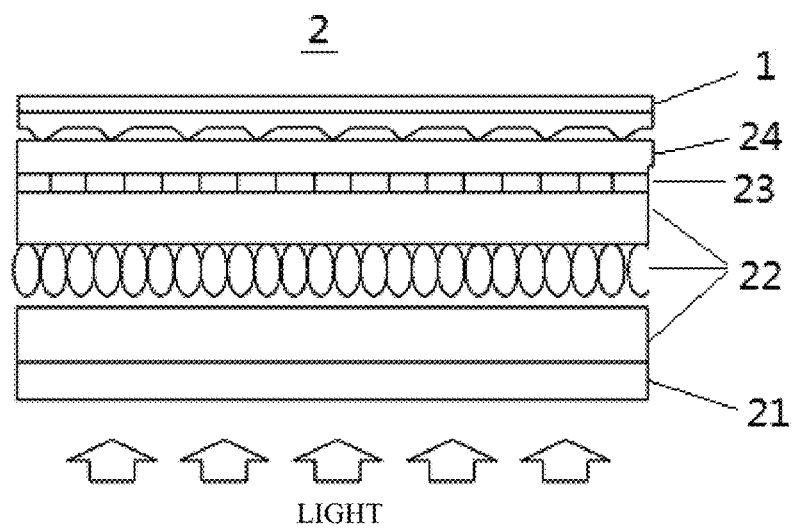
FIG. 7 is a schematic diagram of a wide viewing TFT-LCD having the wide viewing film according to an embodiment of the present invention.

FIG. 7 is a schematic diagram of a wide viewing thin film transistor liquid crystal display (TFT-LCD) having a wide viewing film according to an embodiment of the present invention. As shown in FIG. 7, the wide viewing film 1 is disposed on a second polarizing film 24 of the TFT-LCD 2. The light incident surface of the wide viewing film 1 faces a light emitting surface of the second polarizing film 24. The TFT-LCD 2 includes a first polarizing film 21, a liquid crystal panel 22, a color filter 23, the second polarizing film 24 and the wide viewing film 1 along a light propagation direction.

Figure 8:
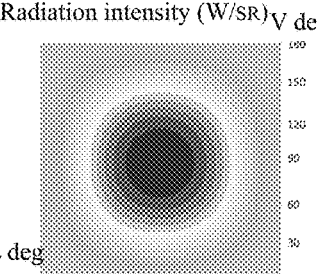
FIG. 8 is a comparison table of brightness and viewing angle between a conventional LCD and a wide viewing TFT-LCD according to an embodiment of the present invention.
Figure 8:
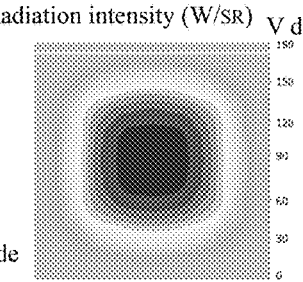
Figure 8:
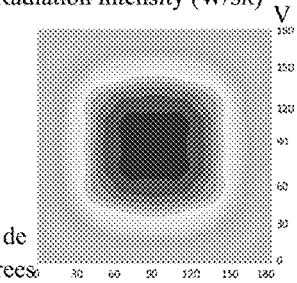
Figure 8:
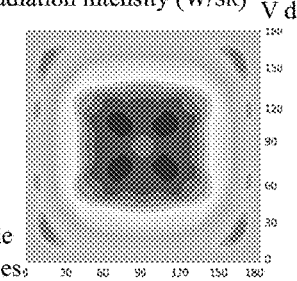
Figure 9:
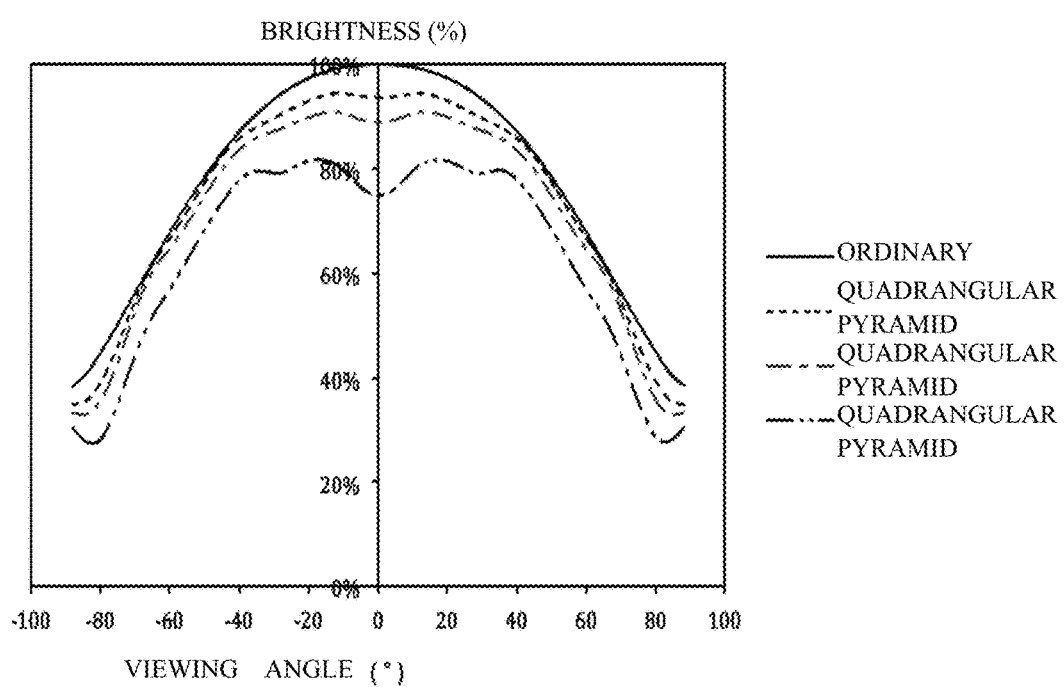
FIG. 9 is a relationship diagram between brightness and viewing angle shown in FIG. 8.

FIG. 8 is a comparison table of brightness and viewing angle between a conventional LCD and a wide viewing TFT-LCD according to an embodiment of the present invention; FIG. 9 is a relationship diagram between brightness and viewing angle shown in FIG. 8.

In FIG. 8 and FIG. 9, a brightness and viewing angle diagram of a conventional LCD and a brightness and viewing angle diagram of a wide viewing TFT-LCD. As shown in a second column of the table in FIG. 8, and using the brightness and viewing angle of a conventional LCD without disposing a wide viewing film as a reference, the brightness at a normal line of the light emitting surface of the LCD is 100%. As shown in the three examples in the table shown in FIG. 8, the quadrangular pyramid-shaped protrusion 101 is a regular quadrangular pyramid ($L_1=L_2$). Besides, distances between the quadrangular pyramid-shaped protrusions at two directions are the same (that is, $P_1=P_2$). In the three examples, values of $$\frac{L_1}{P_1} \text{ and } \frac{L_2}{P_2}$$

are respectively 50/200=0.25, 50/150=0.33 and 50/100=0.5. Each included angle between the side surface and the bottom surface is 45°. The brightness at normal line direction of the LCDs in the three examples are 94%, 89% and 75%. As shown in FIG. 8 and FIG. 9, comparing with the conventional LCD without disposing the wide viewing film, the viewing angle of the wide viewing TFT-LCD of the present invention is increased. Besides, when each included angle between the side surface and the bottom surface is 45°, along with the increase of the values of $$\frac{L_1}{P_1} \text{ and } \frac{L_2}{P_2},$$

the viewing angles of the LCDs are gradually increased.

Figure 11:
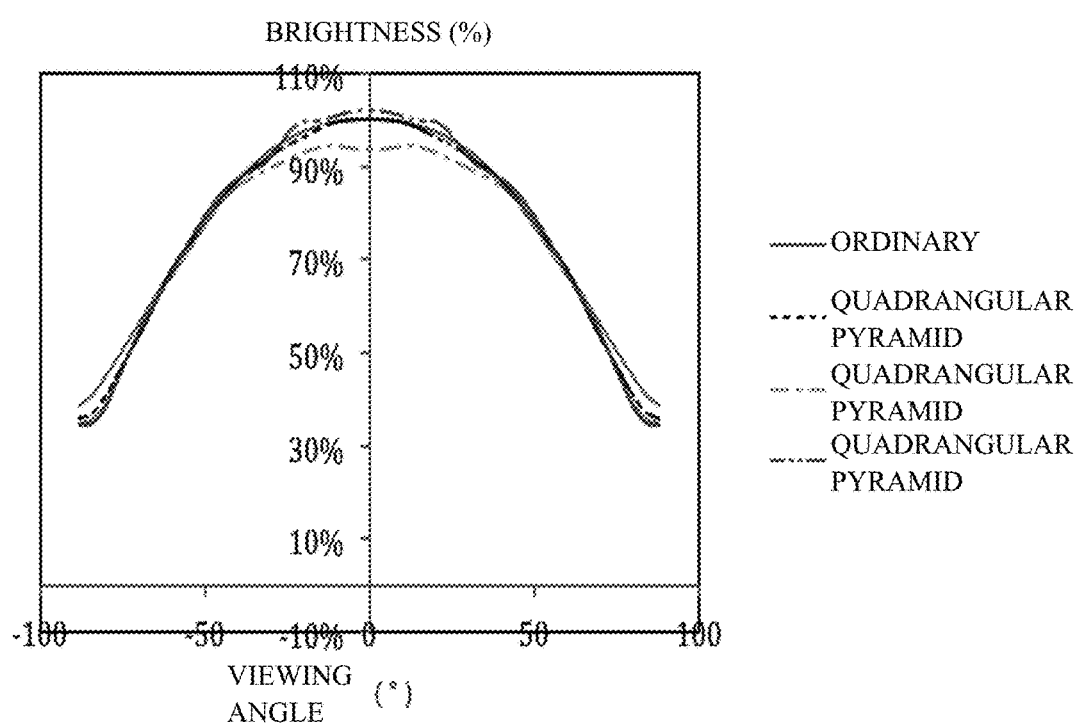
FIG. 11 is a relationship diagram between brightness and viewing angle shown in FIG. 10.

FIG. 10 is a comparison table of brightness and viewing angle between a conventional LCD and a wide viewing angle TFT-LCD according to another embodiment of the present invention; and FIG. 11 is a relationship diagram between brightness and viewing angle shown in FIG. 10. As shown in a second column of the table in FIG. 8, and using the brightness and viewing angle of a conventional LCD without disposing a wide viewing film as a reference, the brightness at a normal line of the light emitting surface of the LCD is 100%. As shown in the three examples in the table shown in FIG. 10, the quadrangular pyramid-shaped protrusion 101 is a regular quadrangular pyramid ($L_1=L_2$). Besides, distances between the quadrangular pyramid-shaped protrusions at two directions are the same (that is, $P_1=P_2$). In the three examples, values of $$\frac{L_1}{P_1} \text{ and } \frac{L_2}{P_2}$$

are all 50/200=0.25. Three included angles between the side surfaces and the bottom surfaces are respectively A=30°, A=45° and A=60°. The brightness at normal line direction of the LCDs in the three examples are 100%, 94% and 102%. As shown in FIG. 10 and FIG. 11, under the saturation of $$\frac{L_1}{P_1} = \frac{L_2}{P_2} = 0.25,$$

when the included angle is A=45°, the viewing angle widening effect is better than A=30° and A=60°. That is, when the included angles are A=30° and A=60°, the viewing angle widening degree is smaller.

Therefore, preferably, a ratio of $L_1$ to $P_1$ and a ratio of $L_2$ to $P_2$ of the quadrangular pyramid-shaped protrusion 101 of the wide viewing film 1 range from 0.25 to 0.5. An included angle between a side surface and a bottom surface is about 45° (for example, the included angle is ranged from 40° to 50°). Of course, according to the requirement of an actual display effect and an adopted material, the ratio and the included angle of the quadrangular pyramid-shaped protrusion can be changed.

According to the embodiment of the present invention, through disposing quadrangular pyramid-shaped protrusions having different sizes and different distances on the light incident surface of the prism layer such that the light incident surface of the prism layer forms an undulating structure. Accordingly, most of the prism layer is not affected by the bonding glue, and still functions as a refraction interface of the air and the prism layer. Besides, light enters to the light incident surface of the wide viewing film from the air (that is, the light entering into an optically denser medium from an optically thinner medium), which can avoid generating a total reflection phenomenon in order to increase the light transmittance effectively so as to improve the display effect.

According to the wide viewing film and the wide viewing TFT-LCD having the same of the present invention, the viewing angle can be increased, and improving the display effect, Besides, because the quadrangular pyramid-shaped protrusions on the light incident surface of the prism layer is a non-periodicity structure so that the wide viewing TFT-LCD can decrease a possibility of generating a Moire pattern so as to improve the display effect.

Besides, according to the wide viewing film and the wide viewing TFT-LCD having the same of the present invention, through disposing quadrangular pyramid-shaped protrusions on the prism layer of the wide viewing film, the viewing angle at the horizontal direction and the vertical direction can be increased in order to effective increase the display effect.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A wide viewing angle thin-film-transistor liquid crystal display (TFT-LCD), including a first polarizing film, a liquid crystal panel, a color filter, a second polarizing film and a wide viewing film disposed along a light propagation direction, and the wide viewing film comprises:
   a prism layer having a light incident surface and a light emitting surface; and
   a substrate layer having a light incident layer;
   wherein, the light incident surface of the prism layer faces a light emitting surface of the second polarizing film;
   wherein, the prism layer is fixed on the substrate layer, and the light emitting surface of the prism layer is contacted with the light incident surface of the substrate layer; and
   wherein, each of the prism layer and the substrate layer is made of a transparent material, multiple quadrangular pyramid-shaped protrusions are disposed separately on the light incident surface of the prism layer, and the light incident surface of the prism layer between adjacent quadrangular pyramid-shaped protrusions is a planar surface;
   wherein, the substrate layer is disposed above the prism layer, and disposed at a side of the prism layer away from the multiple quadrangular pyramid-shaped protrusions;
   wherein, the light incident surface of the prism layer faces a light emitting surface of the second polarizing film;
   wherein, the multiple quadrangular pyramid-shaped protrusions on the light incident surface of the prism layer is disposed on and contacted with second polarizing film in order to refract a light emitted from the second polarizing film such that a viewing angles at a horizontal direction and a vertical direction is increased; and
   wherein, along a light propagation direction, a first polarizing film, a liquid crystal panel, a color filter, the second polarizing film and the wide viewing film are sequentially provided.

2. The wide viewing angle thin-film-transistor liquid crystal display (TFT-LCD) according to claim 1, wherein, a bottom surface of each quadrangular pyramid-shaped protrusion is a rectangle, each quadrangular pyramid-shaped protrusion satisfies following conditions:

$$40° \leq A \leq 50°;$$
$$0.25 \leq \frac{L_1}{P_1} \leq 0.5; \text{ and}$$
$$0.25 \leq \frac{L_2}{P_2} \leq 0.5;$$

wherein, A represents an included angle between a side surface and the bottom surface of the quadrangular pyramid-shaped protrusion; each of L1 and L2 represents an edge length of the bottom surface of the quadrangular pyramid-shaped protrusion; P1 represents a distance between adjacent quadrangular pyramid-shaped protrusions along a direction of L1; and P2 represents a distance between adjacent quadrangular pyramid-shaped protrusions along a direction of L2.

3. The wide viewing angle thin-film-transistor liquid crystal display (TFT-LCD) according to claim 2, wherein, shapes of the multiple quadrangular pyramid-shaped protrusions are similar, but bottom surfaces of the multiple quadrangular pyramid-shaped protrusions are not the same, a ratio of L1 to P1 and a ratio of L2 to P2 of the multiple quadrangular pyramid-shaped protrusions is changed, an arrangement of the quadrangular pyramid-shaped protrusions is irregular, and the light incident surface of the entire wide viewing film forms an undulating structure.

4. The wide viewing angle thin-film-transistor liquid crystal display (TFT-LCD) according to claim 1, wherein, the multiple quadrangular pyramid-shaped protrusions are arranged on the light incident surface of the prism layer as a dotted matrix.

5. The wide viewing angle thin-film-transistor liquid crystal display (TFT-LCD) according to claim 1, wherein, a refractive index of the prism layer is greater than 1.53.

6. The wide viewing angle thin-film-transistor liquid crystal display (TFT-LCD) according to claim 1, wherein, the substrate layer is a polyethylene terephthalate (PET) layer, a polycarbonate (PC) layer or a polymethylmethacrylate (PMMA) layer.

* * * * *